United States Patent
Kaylan et al.

(10) Patent No.: US 6,911,060 B2
(45) Date of Patent: Jun. 28, 2005

(54) FLOOR STANDING TREATMENT DEVICE

(75) Inventors: Ali Kaylan, St. Joseph, MI (US); Guolian Wu, St. Joseph, MI (US); Armando Luisi, Varese (IT); Andrew D. Litch, St. Joseph, MI (US); Paul B. Allard, Watervliet, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/393,122

(22) Filed: Mar. 20, 2003

(65) Prior Publication Data

US 2004/0182054 A1 Sep. 23, 2004

(51) Int. Cl.⁷ .......................... B01D 35/30; B01D 39/14
(52) U.S. Cl. .......................... 55/356; 55/459.3; 55/471; 55/473; 55/357; 55/490; 55/496; 55/501; 55/511; 55/DIG. 34; 96/384
(58) Field of Search ................................ 55/459.3, 471, 55/473, 356, 357, 490, 496, 501, 511, DIG. 34; 96/384

(56) References Cited

U.S. PATENT DOCUMENTS

| | | |
|---|---|---|
| 5,435,817 A | 7/1995 | Davis et al. |
| D362,296 S | 9/1995 | Schmidt |
| 5,536,140 A | 7/1996 | Wagner et al. |
| 5,560,120 A | 10/1996 | Swanson et al. |
| 5,641,343 A * | 6/1997 | Frey .............................. 96/135 |
| 5,738,492 A | 4/1998 | Stanko et al. |
| D402,745 S | 12/1998 | Termeer et al. |
| 6,017,375 A * | 1/2000 | Duell et al. .................... 55/356 |
| D435,097 S | 12/2000 | Huang |
| D439,645 S | 3/2001 | Zemp et al. |
| 6,245,120 B1 * | 6/2001 | Stanek ......................... 55/357 |
| D450,377 S | 11/2001 | Terpko et al. |
| D450,825 S | 11/2001 | Nakamura et al. |
| D451,181 S | 11/2001 | Miwa |
| D451,182 S | 11/2001 | Tsuji |
| 6,471,736 B2 * | 10/2002 | Campbell et al. .............. 55/356 |
| 6,616,720 B1 * | 9/2003 | Smith .......................... 55/385.2 |
| 6,616,722 B1 * | 9/2003 | Cartellone .................. 55/459.3 |
| 6,623,538 B2 * | 9/2003 | Thaukur et al. ........... 55/385.2 |

* cited by examiner

*Primary Examiner*—Minh-Chau T. Pham
(74) *Attorney, Agent, or Firm*—John F. Colligan; Stephen Krefman; Robert O. Rice (57) ABSTRACT

The present invention relates to a floor standing treatment device that has a front panel and a mainframe assembly adapted to be removably attachable to the front panel. The mainframe assembly has an integrally molded latching mechanism having a latch and one or more L shaped guides configured to cooperate with one or more pairs stops for limiting lateral movement of the latch. The latch is adapted to engage a portion of the front panel for securely attaching the front panel to the mainframe assembly. The air purifier may also have a cavity positioned along a bottom edge of a back housing to house an electrical cord provided with the air purifier. Additionally, the air purifier may also have an elongated slot positioned at the apex of the mainframe assembly for allowing one or two handed carrying of the air purifier.

7 Claims, 9 Drawing Sheets

FLOOR STANDING TREATMENT DEVICE

BACKGROUND OF THE INVENTION

1. Field of the Invention

The present invention relates to floor standing treatment devices such as air purifiers, dehumidifiers, air conditioners or floor heaters, and more particularly to an air purifier having a latching mechanism, cord storage area, carrying handle and improved motor mount assembly.

2. Background of the Invention

Portable and/or floor standing treatment devices including air purifiers, air conditioners, dehumidifiers, and heaters provide benefits in the home and workplace and are increasing in popularity among consumers desiring to live and work in cleaner and healthier environments. Typically these devices contain mechanical components such as heating elements, motors and fans which should not be readily accessible. Accordingly, it would be advantageous to provide the floor standing treatment device with a latching mechanism that prevented access to such components. Additionally, it would be advantageous if the latching mechanism was designed for long-lasting use and prevented from prematurely failing or breaking.

Due to the increased popularity of floor standing treatment devices, many users may desire to selectively use a particular treatment device in the home or at the office, without having to purchase two separate products. Additionally, the same floor standing treatment device may be desired for use in one or more different locations around the home. Unfortunately, most floor standing treatment devices, specifically air purifiers are cumbersomely large and lack handles, which prevents easy portability of the device. Accordingly, it would be advantageous to provide an air purifier with a one or two handed carrying handle for providing easy portability of the purifier.

Lastly, since it is not necessary to precisely locate a floor standing treatment device within a room, most users typically situate these devices on the floor and closely adjacent an unused portion of a wall in the office or home. However, since these devices typically have a cord and grommet that protrudes from the back, these devices are prevented from resting close to any wall. Additionally, since most of these devices have several feet of electrical cord attached, it is sometimes difficult to position the device so as to eliminate the "tripping" danger associated with having a loose cord. Accordingly, it would be advantageous to provide a floor standing treatment device adapted to be placed closely adjacent an interior room wall and one that provided a storage space for unused electrical cord.

SUMMARY OF THE INVENTION

One embodiment of the present invention is a floor standing treatment device that comprises a front panel and a mainframe assembly that is adapted to be removably attachable to the front panel. The mainframe assembly comprises an integrally molded latching mechanism that has a latch and one or more L shaped guides configured to cooperate with one or more pairs stops for limiting lateral movement of the latch. The latch is adapted to engage a portion of the front panel for securely attaching the front panel to the mainframe assembly.

Another embodiment of the invention is a floor standing treatment device that comprises a front panel, a back housing, and a mainframe assembly configured to be removably attachable to both the front panel and the back housing. The back housing further comprises a cavity positioned along a bottom edge of the back housing. The cavity is configured to house at least a portion of an electrical cord provided with the floor standing treatment device.

Yet another embodiment of the invention is a floor standing treatment device that comprises a front panel, a back housing, and a mainframe assembly. The mainframe assembly comprises a handle positioned toward the apex of the mainframe assembly and is adapted to allow one or two handed gripping of the device.

Another embodiment of the invention is a floor standing treatment device that comprises a mainframe assembly having a motor mount. The motor mount has a first side and a second side. The first side of the motor mount comprises one or more structural support ribs extending between the mount and the mainframe assembly and has a two substantially parallel outer support fins. The second side of the motor mount further comprising two substantially parallel outer support fins which form a substantially circular air intake frame.

BRIEF DESCRIPTION OF THE DRAWINGS

The accompanying drawings, incorporated in and forming part of the specification, illustrate several aspects of the present invention and together with their description serve to explain the principles of the invention. In the drawings:

FIG. 5b depicts a rear perspective view of the motor mount assembly in FIG. 5a;

DETAILED DESCRIPTION

Figure 1:
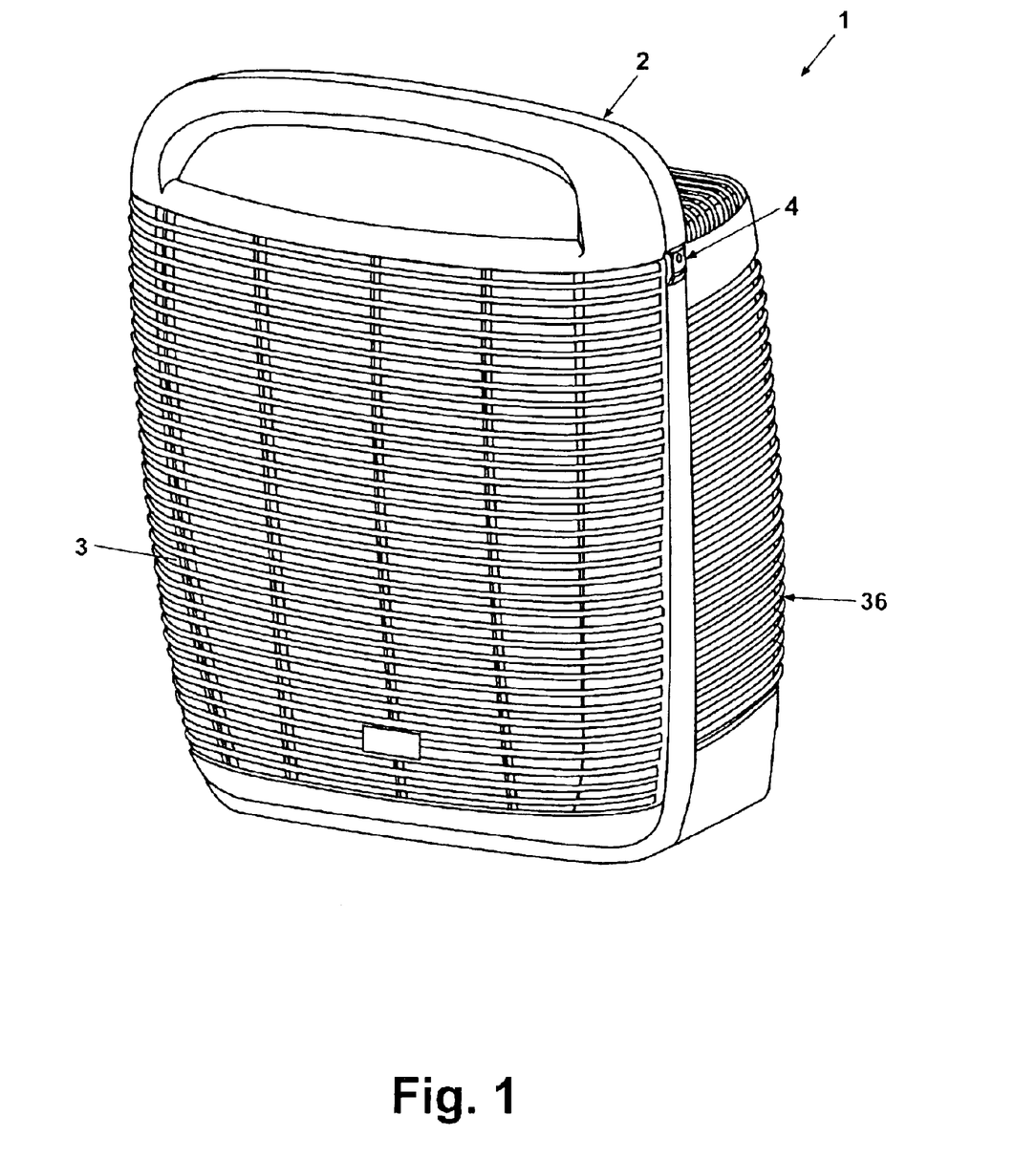
FIG. 1 is a perspective view of a floor standing treatment device, specifically an air purifier, in accordance with an exemplary embodiment of the present invention.
Figure 6:
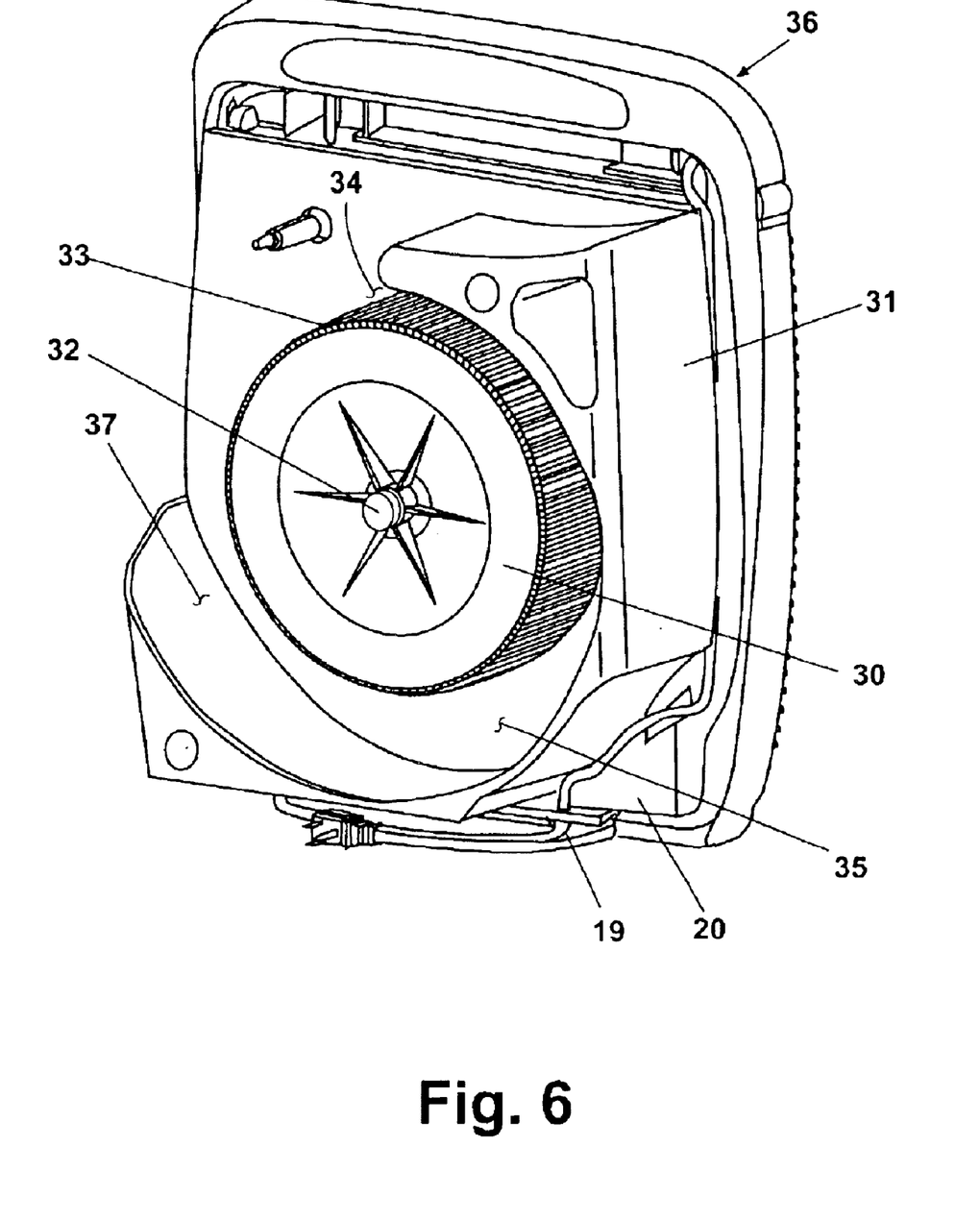
FIG. 6 illustrates the exemplary internal/mechanical components of the floor standing treatment device as shown in FIG. 1.

Referring now to the drawings in detail, wherein like numerals indicate the same elements throughout the views, FIG. 1 illustrates a perspective view of an exemplary embodiment of a floor standing treatment device 1, particularly an air purifier, in accordance with the present invention. The exemplary floor standing treatment device 1 comprises a mainframe assembly 2, a front panel 3 and a back housing 36. The back housing 36 is removably attachable to the mainframe assembly 2 for providing easy access the fan 30 (as best illustrated in FIG. 6) of the air purifier for allowing a user to easily change/clean the fan. As one of skill in the art will recognize, the back housing 36 may be removably attachable to the mainframe assembly 2 in any variety of known ways, and such assembly is easily adaptable to any variety of floor standing treatment device.

The front panel is also removably attachable to the mainframe assembly 2. The front panel 3 may also be attachable to the mainframe assembly 2 in any variety of known ways, but in the exemplary embodiment, the front panel 3 "snap" engages a latching mechanism 4 attached to the mainframe assembly 2 as generally illustrated in FIG. 1. As one of skill in the art should appreciate, the latching mechanism 4 may be integrally or separately attached to the mainframe assembly 2 and may be positioned at virtually any position on the mainframe assembly 2 for allowing secure attachment of the mainframe assembly 2 to the front panel 3. Alternatively, it should also be recognized that the latch assembly may be positioned on the front panel 3 for "snap" engagement with the mainframe assembly 2.

Figure 2:
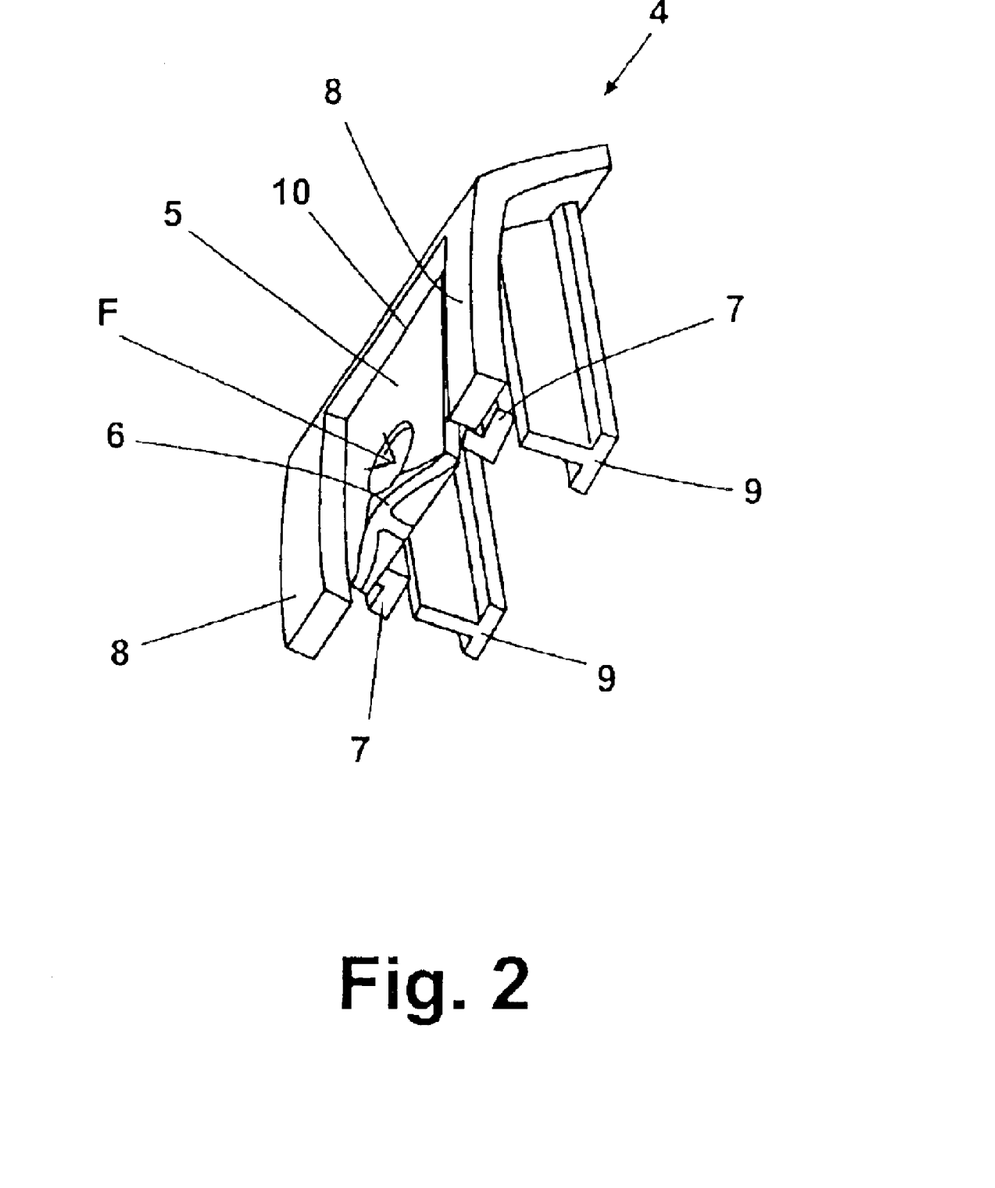
FIG. 2 illustrates a blown-up view of the latching mechanism as shown in FIG. 1.

The exemplary embodiment of FIG. 2 illustrates a blown-up view of the latching mechanism 4 as shown in FIG. 1. The latching mechanism 4 comprises a latch 5 having an arched protuberance 6, guides 7, external stops 8 and internal stops 9. In the exemplary embodiment, the latching mechanism 4 is integrally connected or molded to the mainframe assembly 2. The latching mechanism 4 is also contemplated to be made from a plastic or other suitable material which has elastic properties for allowing lateral or side-to-side movement of the latch 5. For example, in the at rest position as illustrated in FIG. 2, the latch 5 is capable of being moved laterally or side-to-side with a manual force "F" exerted on the latch 5. In the absence of such a force, the material characteristics of the latch should allow the latch 5 to return or rest in the at rest position.

In the event the material chosen does not provide for easy lateral or side-to-side movement, the latch may be further provided with an indentation 10, which provides for improved movability or flexibility of the latch 5. The indentation 10 is contemplated to be a predefined area of the latch that has less thickness than the surrounding area. For example, in the embodiment of FIG. 2, the indentation 10 is the notch that extends the width of the latch 5. The lesser thickness of the indentation 10 area allows the latch to be more flexible and movable with respect to the stationary surrounding mainframe assembly 2.

The latch 5 of the latching mechanism 4 is contemplated to be an integral or molded extension of the mainframe assembly 2. As illustrated, the latch 5 comprises a pair of "L-shaped" guides 7 that extend from the top and bottom of the latch 5. The L-shaped guides 7 extend inward and upward/downward with respect to the latch and are provided to prevent over extension of the latch, which may cause the latch to break or snap from the latching mechanism 4. A pair of external stops 8 and internal stops 9 are also integral or molded extensions of the mainframe assembly 2. The external stops 8 are positioned externally adjacent the guides 7 and are positioned to prevent over-extension of the latch in an outward direction. Similarly, the internal stops 9 are positioned internally adjacent the guides 7 and are positioned to prevent over-extension of the latch in an inward direction. In other words, the stops (8, 9) are configured to prevent the latch 5 from being overly extended in any side-to-side or lateral direction. For example, if the latch 5 is manually pushed in by a user (force "F" in FIG. 1), the guides 7 of the latch 5 abut the internal stops 9 thereby preventing further lateral movement of the latch 5. Conversely, if the latch 5 is manually pulled out by a user, the guides 7 of the latch 5 abut the external stops 8 thereby preventing further lateral movement of the latch 5. In this way, the latch is prevented from being over-extended, which may cause failure of the latch 5.

In the exemplary embodiment as illustrated in FIG. 2, the latch 5 is also provided with an arched protuberance 6, which is contemplated to be an arch that extends outward from the latch 5. The arch is configured to extend a predetermined distance out from the latch 5 such that the protuberance 6 can "snap" engage a corresponding slot 11 positioned on the front panel 3 of the mainframe assembly 2. The snap engagement of the arched protuberance 6 in the corresponding slot 11 allows the front panel 3 to be securely attached to the mainframe assembly 2.

In operation, to place or remove the panel 3 from the mainframe assembly, a user is required to manually push on the latch 5 (force "F") causing the latch to laterally move to a position wherein the protuberance 6 no longer protrudes beyond the external stoppers 8, which allows for insertion/removal of the front panel 3 from the mainframe assembly 2. In this way, the front panel 3 can be easily removed and replaced from the mainframe assembly 2 as desired by the user.

Figure 3A:
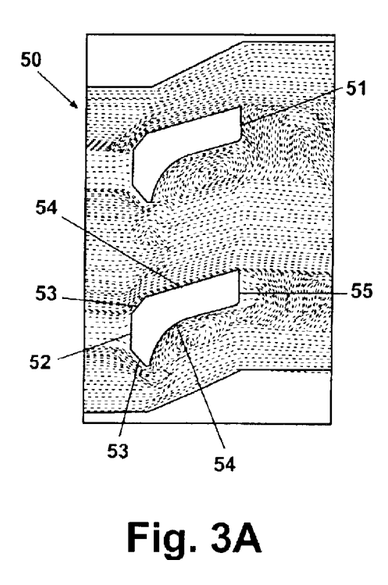
FIG. 3a illustrates a cross-sectional view of an exemplary louver design and a fluid dynamic simulation of air flow through the louver design.
Figure 3B:
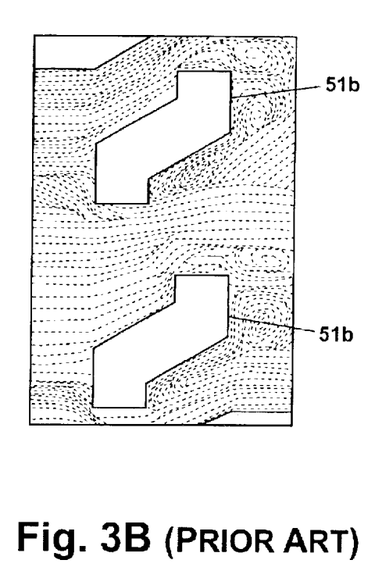
FIG. 3b illustrates a cross-sectional view of a prior art louver design and a fluid dynamic simulation of air flow through the louver design.

FIG. 3a depicts an exemplary fluid dynamic simulation of an embodiment of a louver design 50 associated with the front panel 3 of the floor standing treatment device. The exemplary louvers 51 are configured in such a way that an average height person standing approximately 6 feet away from the device cannot see through the louvers 51 when the product is on the floor under normal lighting conditions. Additionally, as illustrated in FIG. 3a, the louvers 51 are optimized to allow for increased air flow through the louvers 51 than as seen in the louvers 51b of the prior art as shown in FIG. 3b. In particular, the louvers 51 of the present invention allow for more air to pass through the louvers with less pressure drop and less turbulence than the louvers 51b in the prior art. Put another way, more air can be taken in through the louvers at the same velocity than the prior art, or the same amount of air can be taken in as in the prior art design but at a lower overall velocity. In this way, the floor standing treatment device 1, should be quieter than devices of the prior art because more air can be taken in through the louvers 51.

In the exemplary embodiment, the louvers 51 have a generally "boot" shaped appearance, with the "bottom" 52 of the boot facing into the direction of air flow. The bottom of the boot has a substantially flat, vertical surface 52 with inclined surfaces 53 on each side providing some improved aerodynamic performance. The "toe" of the boot is generally formed by one of the inclined surfaces 53 in combination with an upwardly arched portion 54 that follows to the "top" of the boot. The "top" of the boot is a substantially flat, vertical surface 55 that faces away from the direction of the air flow. Lastly, an angled top surface 56 defines the top of the surface of the louver 51 and "back side" portion of the boot.

Figure 4:
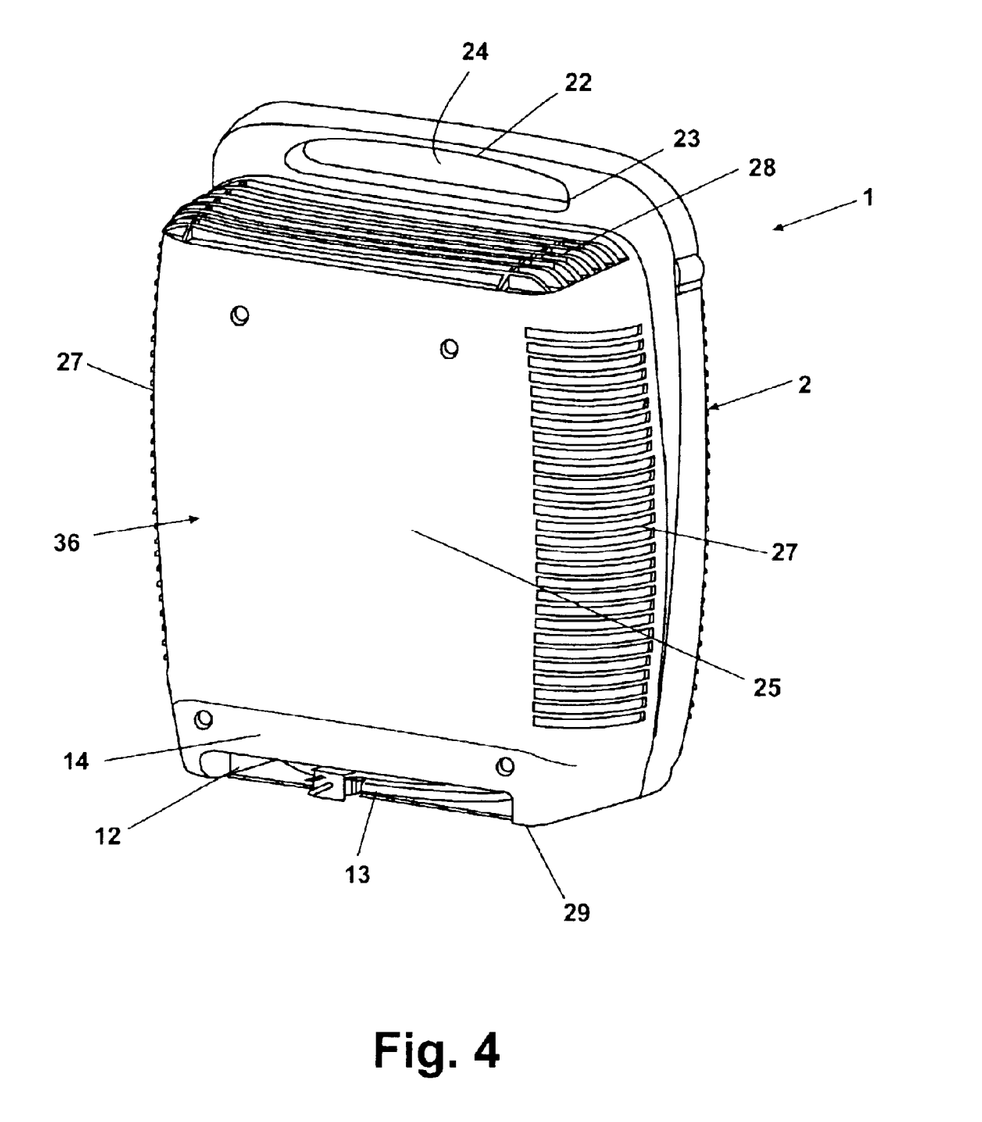
FIG. 4 depicts a rear perspective view of the back housing and mainframe assembly of the floor standing treatment device in accordance with the present invention.

FIG. 4 depicts a rear perspective view of the back housing 36 and mainframe assembly 2 of the floor standing treatment device in accordance with the present invention. The back housing 36 has a back wall 25, two side walls 27, a top surface 28 and a bottom surface 29. As will be described in more detail below, the back housing 36 houses some of the mechanical components of the floor standing treatment device 1 including the fan 30.

As further illustrated in FIG. 4, the mainframe assembly 2 comprises a handle 22 for carrying the floor standing treatment device 1. Since the typical floor standing treatment device, specifically the air purifier is cumbersomely large, a handle 22 may be provided to allow the purifier to be easily moved from one location to another. In the exemplary embodiment, the handle 22 comprises an elongated, curved opening 23 for providing a one or two handed gripping of the air purifier. While the handle 22 could have virtually any shaped opening 23, in this embodiment, the handle has a substantially flat bottom and a curved or arched opening for gripping and moving the air purifier 1. Additionally, it is noted that for convenience the handle is located toward the apex of the mainframe assembly 2.

While the opening 23 of the handle may be designed to be a through-hole, in the exemplary embodiment, the handle has an interior wall 24 which prevents a user from putting his/her fingers through the opening 23. One of the purposes of such a design is to provide a more compact design which provides a more aesthetically pleasing front panel. In particular, such a design allows the handle to be built in the floor standing treatment device without it being visible from a front elevational view.

As further illustrated in FIG. 4, the back housing 36 further comprises an elongated cavity 12 positioned along the bottom surface 29 of the housing 36. The cavity 12 is configured to house the electrical cord 13, or at least a portion of the electrical cord 13, that provides electrical power to the free standing treatment device. While the cavity 12 could be of virtually any shape or size, in the exemplary embodiment, the cavity 12 is roughly rectangular and of sufficient volume to allow the entire electrical cord 13 to be stored therein. Such a design allows the electrical cord 13 to be stored when the floor standing treatment device 1 is not in use such as being carried from one location to another. Additionally, this design allows the unused portion of the cord 13 to be stored when the product is in use, which minimizes any potential hazards associated with a loose cord (i.e. tripping, etc.) and provides for a neater and cleaner appearance.

Referring briefly to FIG. 6, the electrical cord 13 is securely attached to the floor standing treatment device 1 via a cord grommet 19. The cord grommet 19 interfaces with an internal surface 20 of the mainframe assembly 2 to securely attach the electrical cord to the treatment device 1. As one of skill in the should recognize, with the back housing attached to the mainframe assembly, the cord grommet 19 will appear to extend from the ceiling 38 of the cavity 12. However, the grommet 19 could also be adapted to extend from the side walls 21 or the back wall of the cavity.

The design of the grommet 19 being positioned within the elongated cavity 12 allows the free standing treatment device 1 to be placed closely adjacent any wall relative to an electrical outlet (not shown) without interference from a protruding grommet as is typical in the state of the art. For example, typical floor standing treatment devices that rely on use of an electrical power cord have a grommet that protrudes from the exterior of the device. Since grommets are typically stiff and inflexible, any device having such a grommet needs to be pulled out from the wall and cannot be positioned closely adjacent to the wall to allow for clearance of the grommet. Accordingly, the present design eliminates the need for such clearance because the grommet 19 is housed within a cavity 12 associated with the floor standing treatment device 1.

Referring back to FIG. 4, the floor standing treatment device 1 of the present invention may further comprise a recessed portion 14 which further improves the device's adaptability to be placed closely adjacent a wall. In this embodiment, a portion of the bottom of the back housing 36 is curved inward to accommodate for base boards associated with a typical wall. As one of ordinary skill in the art will recognize, the inward curvature of the back housing allows the device 1 to be fit more "snugly" against an interior wall of a home. Accordingly, the combination of the recessed portion 14 of the device and the grommet 19 being positioned within the cavity 12, allows the floor standing treatment device to rest flush with most walls in a home.

Figure 5A:
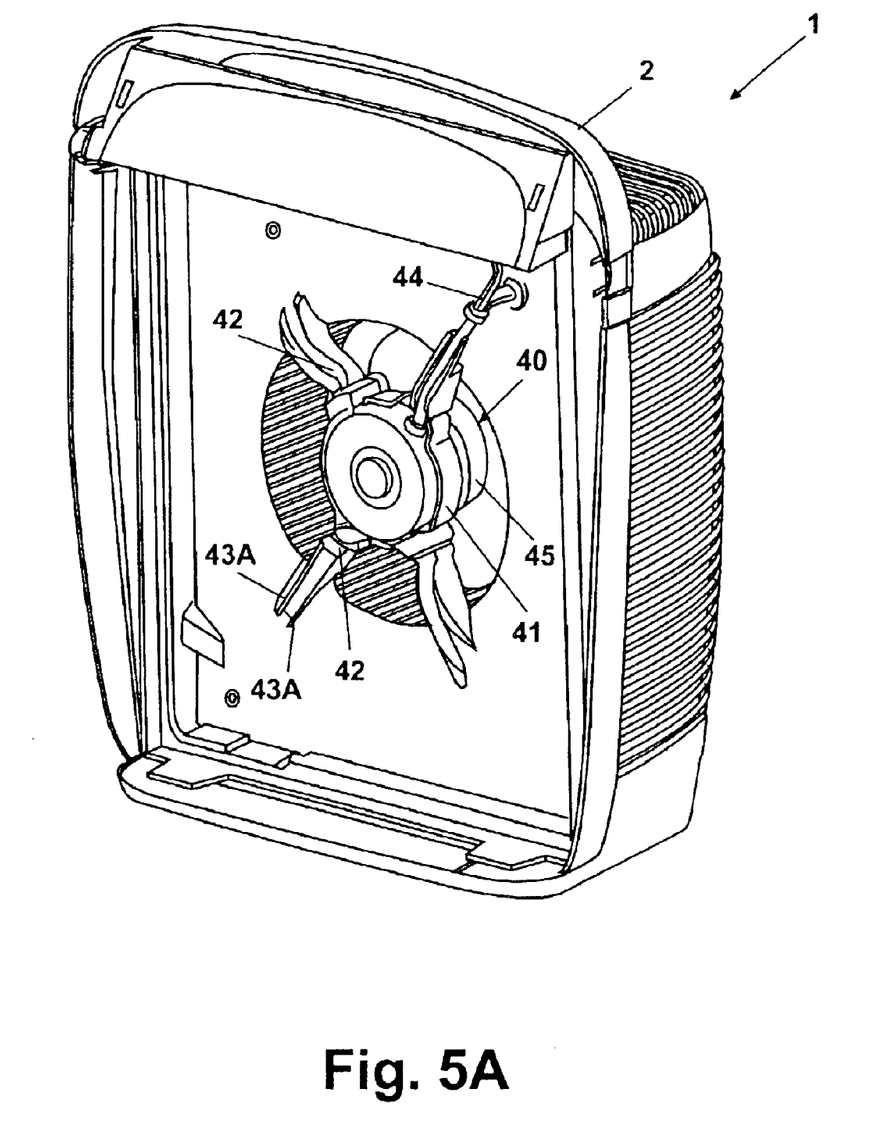
FIG. 5a depicts a front perspective view of a motor mount assembly in accordance with an exemplary embodiment of the present invention.

FIG. 5a illustrates the floor standing treatment device 1 with the front panel 3 removed from the mainframe assembly 2. The mainframe assembly 2 comprises a motor mount assembly 40 that as one of skill in the art will appreciate, was designed with enough structural integrity for the motor and fan to withstand rigorous shipping and handling situations. The motor mount assembly 40 comprises a mount 41 having, preferably, four spaced support ribs 42. The support ribs 42 each comprise two substantially parallel support fins 43a which extend between the mount 41 and the mainframe assembly 2 and provide the structural integrity for the assembly 40. While the present embodiment illustrates four ribs, it should be recognized that more or less ribs could be used.

Not only do the ribs 42 and accompanying fins 43a provide structural support for the mount 41, but the fins have the dual purpose of providing a "guide" for wiring 44 from the motor 45 to the user controls. In this way, the wiring 44 is "neatly" tucked in between the parallel support fins and does not further obstruct airflow.

Figure 5B:
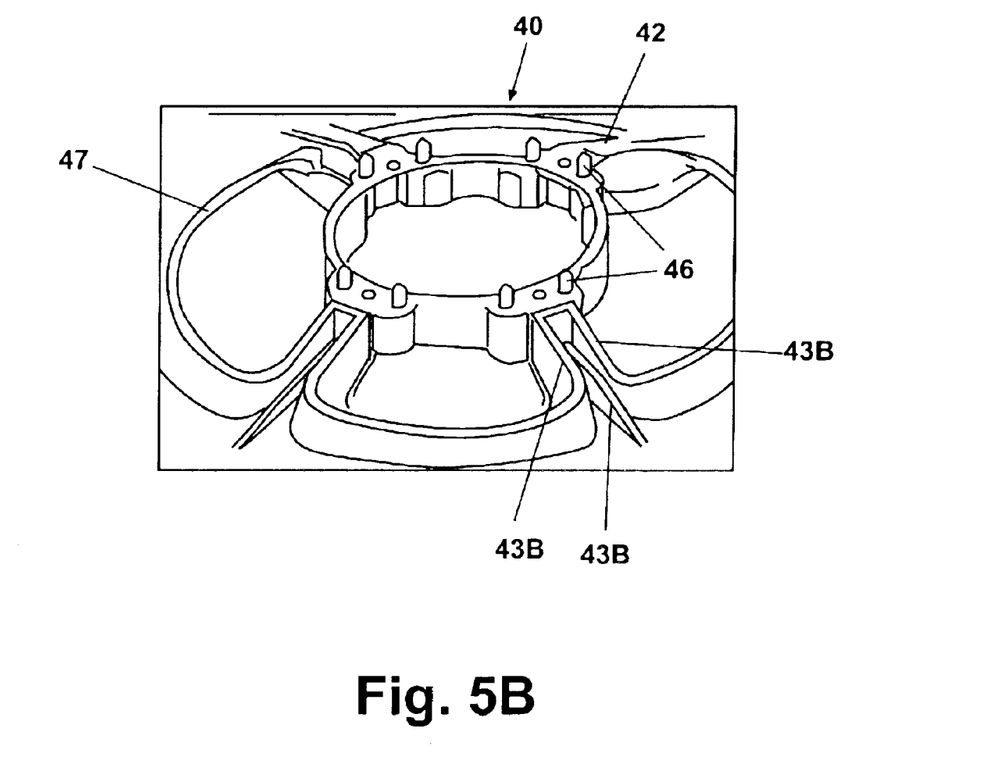

FIG. 5b illustrates the opposite side of the motor mount assembly 40 (i.e. the side facing the back housing 36). This illustration shows the motor mount assembly 40 further comprising a three substantially parallel support fins 43b. Two outer support fins 43b of each rib 42 extend from the mount 41 to the mainframe assembly 2 and form a substantially circular air intake orifice 47. As one of skill in the art should recognize, the air intake orifice 47 is configured to allow air to be pulled through the fan for purification. The third support fin 43b is positioned between the two outer support fins 43b and extends between the mount 41 and onto a portion of the mainframe assembly 2. The third support fin 43b is configured to distribute stresses on the mount 41 to the mainframe assembly 2 thereby providing enhanced structural rigidity to the motor mount assembly 40.

The motor mount assembly 40 may also comprise a plurality of self aligning dowels 46 positioned around the circumference of the mount 41. The dowels 46 are configured to align with corresponding apertures on the motor 45 for providing quick and appropriate alignment of the motor 45 within the mount 41. A plurality of speed clips or Tinnerman® clips might be used to hold the motor in place once it has been inserted on the dowels 46. Speed clips allow "blind" fastening of screws to secure the motor 45. One of the advantages of using such clips is that no securing or holding of a nut is required, thus, a tool to hold the nut is also not required.

FIG. 6 illustrates the internal/mechanical components of the floor standing treatment device, specifically the components of an air purifier 1 including a fan 30 and scroll 31. The fan 30, scroll 31 and other mechanical components of the purifier 1 are generally housed in the mainframe assembly 2 and back housing 36. The fan 30 is mounted to a drive shaft 32 of a motor 45 and generally rotates clockwise about the horizontal drive shaft 32 axis. Additionally, as one of skill in the art should recognize, the fan 30 may also include a plurality of radially spaced blades 33 to help push air through the purifier.

Figure 7A:
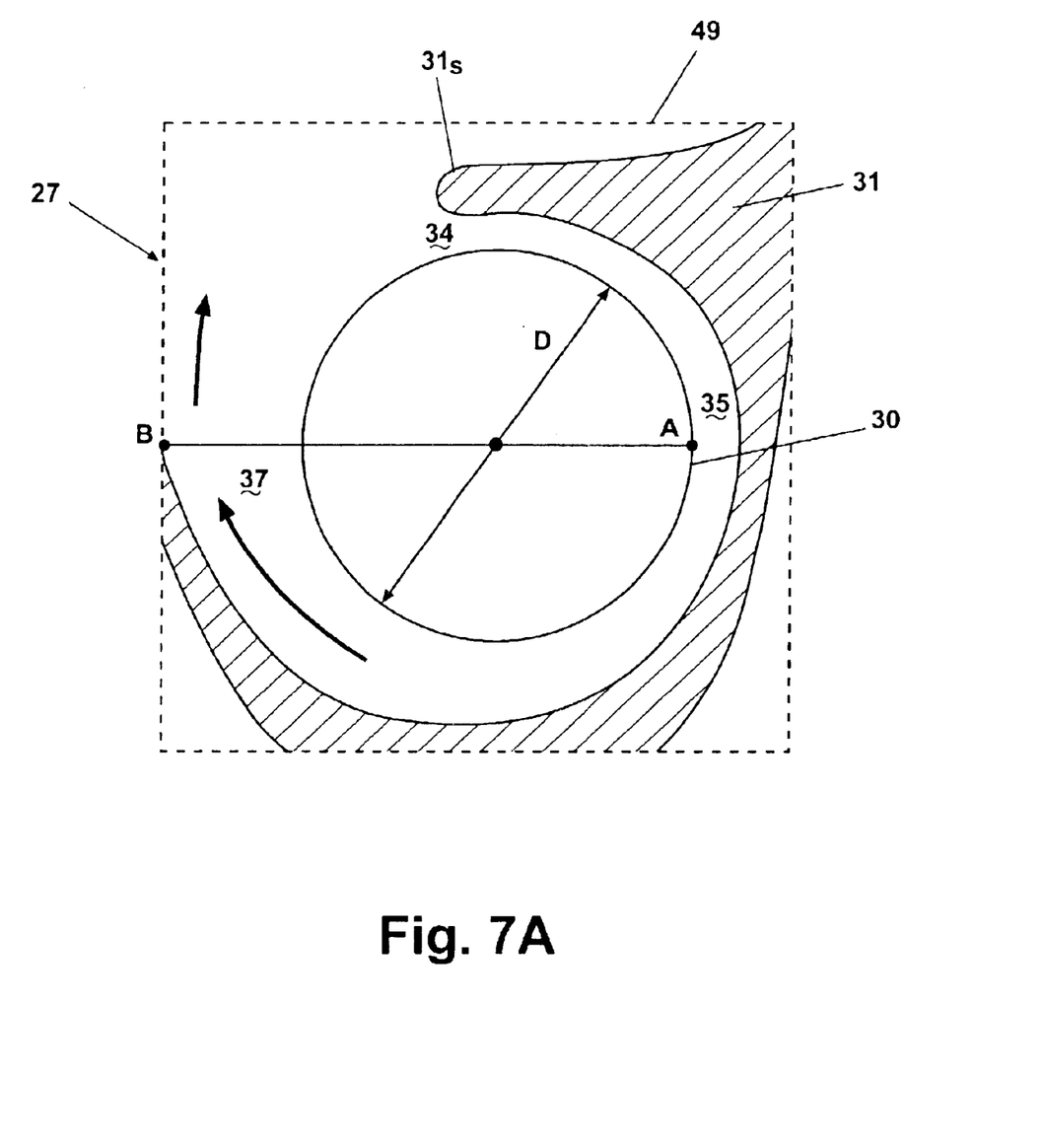
FIG. 7a illustrates a diagrammatic view of a the floor standing treatment device.
Figure 7B:
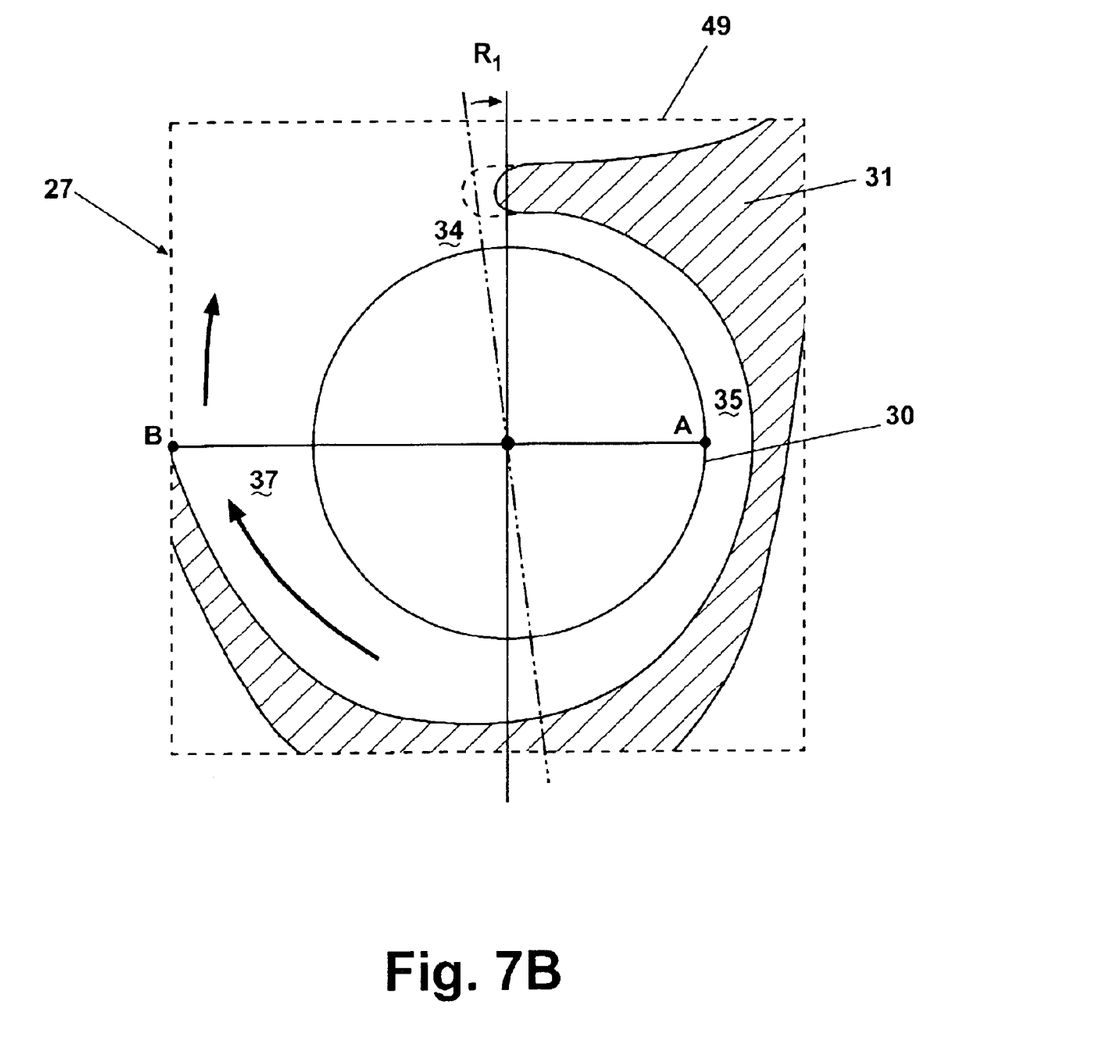
FIG. 7b illustrates an exemplary diagrammatic view of a the floor standing treatment device in accordance with the present invention.

FIGS. 7a and 7b diagrammatically illustrate the floor standing treatment device. As shown in this illustration, the scroll 31 mounts to the mainframe assembly 2 and surrounds a portion of the fan 30. In an exemplary embodiment, the scroll 31 is manufactured from expanded polystyrene, or Styrofoam®. The fan's 30 physical relationship to the scroll 31 defines an air opening 34 through which air enters an air passageway 35 and is exhausted through an air outlet 37. As one of skill in the art will appreciate, the size of the air outlet 37 and corresponding expansion angle contributes to the noise level of the purifier while in operation. The expansion angle $\alpha = \arctan[1/\pi(AB/D-1)]$ where D is the diameter of the fan 30 and AB is indicated by the line AB in FIG. 7a. Typically, the larger the air outlet and expansion angle, the quieter the floor standing treatment device is in operation. Accordingly, the challenge presented in creating a quieter floor standing treatment device, without increasing its size, is maximizing the size of the air outlet 37 and the corresponding expansion angle.

FIG. 7a illustrates a typical floor standing treatment device where the rectangular dashed-line 49 represents a predetermined structural outer frame for any given device such as a floor standing treatment device, and line 31s is representative of the scroll 31. In this embodiment, the air passing through air passageway 35, which is exhausted through an air outlet 37, is abruptly altered by side wall 27 of the floor standing treatment device. At the point "B" where the scroll intersects the side wall 27, turbulence is created in the air flow, which results in a drop in pressure and therefor high noise.

FIG. 7b illustrates one exemplary solution to increasing the size of the air outlet 37 and the corresponding expansion angle while maintaining the approximate size of the floor standing treatment device 1. In this embodiment, the scroll 31 is rotated about the drive shaft 32 axis from about 5 degrees to about 6 degrees as indicated by $R_1$ and the side wall of the floor standing treatment device is slightly arched to match the angle of the scroll 31. The result of the rotation means that the vertical side wall 27 of the mainframe assembly 2 acts as an extension of the scroll 31, which minimizes the turbulence generated by scroll 31 intersecting with sidewall 27. Accordingly, the rotated scroll 31 and corresponding curved sidewall 27 results in less turbulence and less noise than the scroll positioning illustrates in FIG. 7a. Put another way, the resulting rotation of the scroll increases both the air outlet and diffusion angle associated with the device, which reduces the noise generated by the floor standing treatment device. Thus, the size of the floor standing treatment device is maintained while the sound produced by the device is lessened.

The foregoing detailed description of the invention has been presented for purposes of illustration and description. It is not intended to be exhaustive nor limit the invention to the precise form disclosed. Many alternatives, modifications and variations have been discussed above, and others will be apparent to those skilled in the art in light of the above teaching. Accordingly, this invention is intended to embrace all such alternatives and variations as discussed without departing from the scope of the invention.

We claim:

1. A floor standing treatment device, comprising:
   a front panel;
   a mainframe assembly adapted to be removably attachable to the front panel; and
   a latching mechanism integrally molded to the mainframe assembly and adapted to engage a portion of the front panel for securely attaching the front panel to the mainframe assembly, the latching mechanism comprising:
   a latch;
   at least one guide;
   at least one internal stop corresponding to the guide; and
   at least one external stop corresponding to the guide;
   wherein the guide and stops are configured to cooperate to limit the lateral movement of the latch to between the at least one internal stop and the at least one external stop.

2. The floor standing treatment device of claim 1, further comprising a protuberance extending a predetermined distance out from the latch and configured to snap engage a corresponding slot on the front panel.

3. The floor standing treatment device of claim 1, further comprising an indentation positioned on the latch and adapted to provide the latch with lateral movability.

4. The floor standing treatment device of claim 1, further comprising a filter element operable to rotate on a horizontal axis and a scroll through which air is directed.

5. The floor standing treatment device of claim 1, wherein the mainframe assembly further comprises a recessed portion positioned along a portion of the bottom of the exterior of the mainframe assembly for accommodating base boards associated with a typical wall.

6. The floor standing treatment device of claim 1, further comprising a cavity positioned along a bottom edge of a back housing, the cavity being configured to house at least a portion of an electrical cord provided with the floor standing treatment device.

7. The floor standing treatment device of claim 1, further comprising a handle positioned toward an apex of the mainframe assembly; the handle being adapted to allow one or two handed gripping of the device.

* * * * *